US012210942B2

(12) United States Patent
Chu et al.

(10) Patent No.: US 12,210,942 B2
(45) Date of Patent: Jan. 28, 2025

(54) METHOD AND DEVICE FOR DATA PROCESSING, AND STORAGE MEDIUM

(71) Applicant: Beijing Xiaomi Pinecone Electronics Co., Ltd., Beijing (CN)

(72) Inventors: Xiangxiang Chu, Beijing (CN); Bo Zhang, Beijing (CN); Tianbao Zhou, Beijing (CN); Bin Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 993 days.

(21) Appl. No.: 17/146,762

(22) Filed: Jan. 12, 2021

(65) Prior Publication Data

US 2021/0390449 A1 Dec. 16, 2021

(30) Foreign Application Priority Data

Jun. 12, 2020 (CN) .......................... 202010538271.8

(51) Int. Cl.
*G06N 20/00* (2019.01)
*G06N 3/045* (2023.01)
*G06N 3/048* (2023.01)

(52) U.S. Cl.
CPC ............. *G06N 20/00* (2019.01); *G06N 3/045* (2023.01); *G06N 3/048* (2023.01)

(58) Field of Classification Search
CPC ........ G06N 20/00; G06N 3/045; G06N 3/048; G06N 3/084; G06N 3/082; G06N 3/08; G06F 18/214
See application file for complete search history.

(56) References Cited

U.S. PATENT DOCUMENTS 10,510,002 B1  12/2019  Olabiyi
11,403,486 B2 * 8/2022  Quader ............ G06V 30/19173
(Continued)

FOREIGN PATENT DOCUMENTS

CN  108334947 A   7/2018
CN  108875779 A  11/2018
EP    3579148 A1  12/2019

OTHER PUBLICATIONS

"DARTS: Differentiable Architecture Search"; Apr. 2019; Hanxiao Liu, Karensimonyan and Yiming Yang;, Published at ICLR 2019; Code and Pretrained Models, 13 pgs.
(Continued)

*Primary Examiner* — Jordany Nunez
(74) *Attorney, Agent, or Firm* — Cooper Legal Group, LLC

(57) ABSTRACT

Provided are a method and device for data processing and a storage medium. The method includes: inputting labeled training data in a training set into a preset model to be trained and updating the model parameters of the preset model; inputting labeled verification data in a verification set into the preset model after the model parameters are updated to obtain a first prediction label; obtaining a verification loss value based on a difference between the first prediction label and a marked label of the labeled verification data; determining an auxiliary loss value based on current structural parameters of the preset model; determining whether to stop training the preset model based on the verification loss value and the auxiliary loss value; and classifying data to be classified based on a target network model constructed by a network structure included in the trained preset model to obtain a classification result.

15 Claims, 7 Drawing Sheets

(56) References Cited

U.S. PATENT DOCUMENTS

| | | | |
|---|---|---|---|
| 11,537,946 B2* | 12/2022 | Saito | G06N 3/045 |
| 2016/0180214 A1* | 6/2016 | Kanevsky | G06N 3/08 |
| | | | 706/21 |
| 2017/0032018 A1 | 2/2017 | Aleksandrowicz et al. | |
| 2017/0061330 A1* | 3/2017 | Kurata | G06F 16/3344 |
| 2018/0032867 A1* | 2/2018 | Son | G06N 3/04 |
| 2019/0171897 A1* | 6/2019 | Merai | G06N 5/048 |
| 2019/0318202 A1* | 10/2019 | Zhao | G06F 18/214 |
| 2020/0005146 A1* | 1/2020 | Son | G06F 7/523 |
| 2020/0104710 A1* | 4/2020 | Vasudevan | G06N 3/045 |
| 2020/0160112 A1* | 5/2020 | Dennison | G06F 18/15 |
| 2021/0278478 A1* | 9/2021 | He | G06N 3/08 |

OTHER PUBLICATIONS

"Fair DARTS: Eliminating Unfair Advantages in Differentiable Architecture Search" Jun. 2020; Xiangxiang Chu, Tianbao Zhou, Bo Zhang and Jixiang Li; European Conference on Computer Vision (ECCV 2020), Computer Science-Machine Learning, 36 pgs.

Bo He et al., "Application of Artificial Neural Network in Gas Analysis System"; <Modern Electronic Technology>, vol. 10, No. 273, Oct. 2008, pp. 1-3, with English abstract.

Notice of Allowance of the Chinese application No. 202010538271. 8, issued on Oct. 31, 2024, 6 pages with English translation.

* cited by examiner

METHOD AND DEVICE FOR DATA PROCESSING, AND STORAGE MEDIUM

CROSS-REFERENCE TO RELATED APPLICATION

This application claims priority to Chinese patent application No. 202010538271.8, filed on Jun. 12, 2020, the disclosure of which is hereby incorporated by reference in its entirety.

TECHNICAL FIELD

The disclosure relates to the technical field of neural networks, and particularly relates to a method and device for data processing and a storage medium.

BACKGROUND

A neural network is an algorithmic mathematical model that imitates the behavioral characteristics of neural networks of animals and performs distributed parallel information processing. The neural network mainly relies on the complexity of a system to implement information processing by adjusting an interconnected relationship between a large number of internal nodes. The neural network has a wide range of applications in the field of data processing, such as data classification, speech analysis and image recognition. However, a result output based on a neural network has a discretization bias, which may result in low accuracy of a trained model.

SUMMARY

The disclosure provides a method and device for data processing and a storage medium.

According to a first aspect of an embodiment of the disclosure, a method for data processing is provided, and the method for data processing includes:
  inputting labeled training data in a training set into a preset model to be trained and updating model parameters of the preset model, wherein the model parameters comprise structural parameters;
  inputting labeled verification data in a verification set into the preset model after the model parameters are updated to obtain a first prediction label;
  obtaining a verification loss value based on a difference between the first prediction label and a marked label of the labeled verification data;
  determining an auxiliary loss value based on current structural parameters of the preset model;
  determining whether to stop training the preset model based on the verification loss value and the auxiliary loss value to obtain a trained preset model; and
  classifying data to be classified based on a target network model constructed by a network structure included in the trained preset model after stopping training the preset model to obtain a classification result.

According to a second aspect of an embodiment of the disclosure, a device for data processing is provided, and the device for data processing includes:
  a first updating module configured to input labeled training data in a training set into a preset model to be trained and update model parameters of the preset model, wherein the model parameters include structural parameters;
  a first obtaining module configured to input labeled verification data in a verification set into the preset model after the model parameters are updated to obtain a first prediction label;
  a second obtaining module configured to obtain a verification loss value based on a difference between the first prediction label and a marked label of the labeled verification data;
  a first determining module configured to determine an auxiliary loss value based on current structural parameters of the preset model;
  a second determining module configured to determine whether to stop training the preset model based on the verification loss value and the auxiliary loss value to obtain a trained preset model; and
  a classification module configured to classify data to be classified based on a target network model constructed by a network structure included in the trained preset model after stopping training the preset model to obtain classification result.

According to a third aspect of an embodiment of the disclosure, a device for data processing is provided, and the device for data processing includes:
  a processor; and
  a memory configured to store instructions executable by the processor,
  wherein the processor is configured to implement the operations in the above method for data processing when running the instructions.

According to a fourth aspect of an embodiment of the disclosure, a non-transitory computer-readable storage medium is provided. When instructions in the storage medium are executed by a processor of a device for data processing, the device may perform any operations of the above method for data processing.

It should be understood that the above general description and the following detailed description are merely exemplary and explanatory, but do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
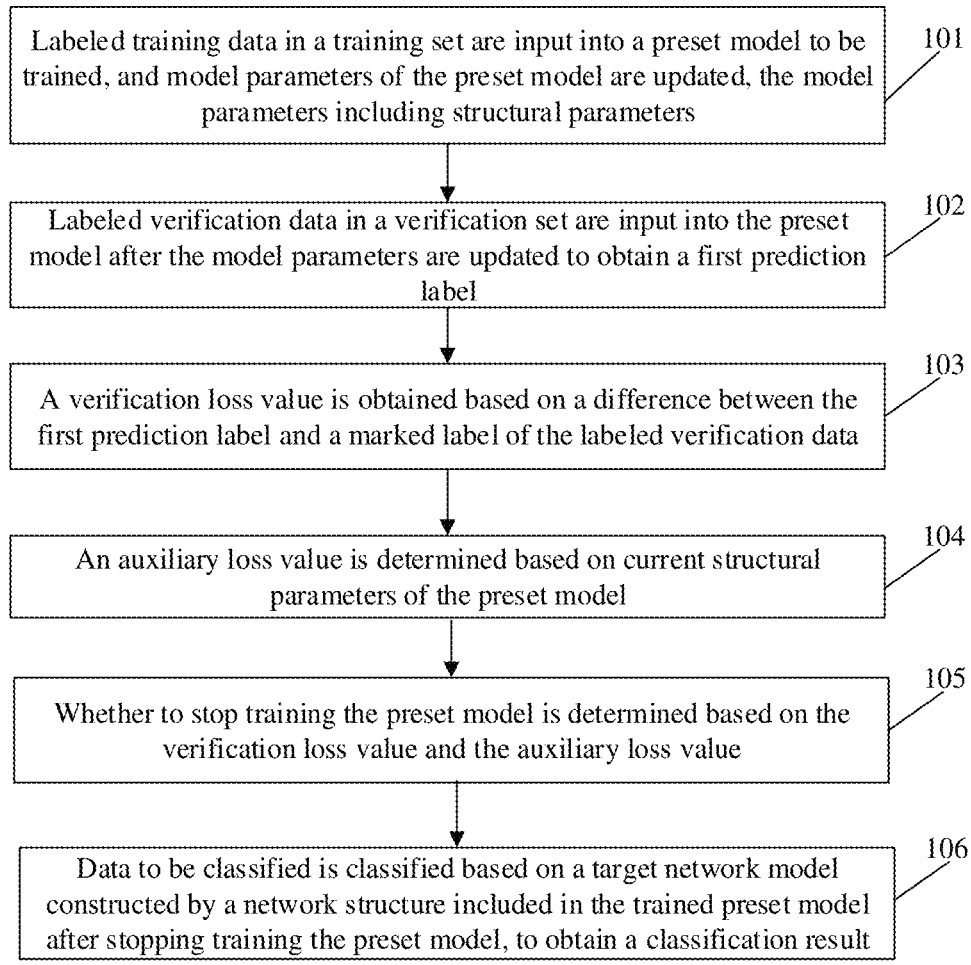
FIG. 1 is a schematic flow diagram of a method for data processing according to an exemplary embodiment.

In the embodiments of the disclosure, a method for data processing is provided. FIG. 1 is a schematic flow diagram of a method for data processing according to an exemplary embodiment. As shown in FIG. 1, the method includes the following operations.

In operation 101, labeled training data in a training set are input into a preset model to be trained, and model parameters of the preset model are updated, the model parameters including structural parameters.

In operation 102, labeled verification data in a verification set are input into the preset model after the model parameters are updated to obtain a first prediction label.

In operation 103, a verification loss value is obtained based on a difference between the first prediction label and a marked label of the labeled verification data.

In operation 104, an auxiliary loss value is determined based on current structural parameters of the preset model.

In operation 105, whether to stop training the preset model is determined based on the verification loss value and the auxiliary loss value.

In operation 106, data to be classified is classified based on a target network model constructed by a network structure included in the trained preset model after stopping training the preset model, to obtain a classification result.

The method for data processing involved in the embodiments of the disclosure may be implemented by electronic devices. Here, the electronic devices may include mobile terminals and fixed terminals. The mobile terminals may include: mobile phones, tablet computers, notebook computers, etc. The fixed terminals may include personal computers. In other optional embodiments, the method for data processing may also be operated on network side devices. The network side devices may include servers, processing centers, etc.

The preset model trained in the embodiments of the disclosure may implement a preset function. The preset function may include, but is not limited to, at least one of the following functions:

target segmentation on targets and backgrounds in an input image;
classification of targets in an input image;
target tracking based on an input image;
diagnostic assistance based on medical images; or
voice recognition, voice correction and the like based on input voice.

The foregoing are only examples of the preset function implemented by the preset model. The specific implementation is not limited to the foregoing examples.

In the process of training a preset model, firstly, labeled training data in a training set is firstly input into a preset model to be trained and structural parameters and/or network parameters of the preset model are updated. The structural parameters may include parameters for representing the structural characteristics of each network structure in the preset model. The structural characteristics may include: a connection relationship between network structures, etc. The preset network is taken as a super-network as an example. Since the super-network may include a plurality of network structures, the connection relationship between the network structures may be represented based on structural parameters. The network parameters may include weight parameters for training each network structure in the preset model. For example, if the preset model includes network structures capable of forming a convolutional neural network, each network structure may be regarded as a filter (a convolution kernel) for forming the convolutional neural network. At this time, the network parameter may be the weight of the filter.

In the embodiments of the disclosure, labeled training data in the training set may be input into the preset model to be trained, and model parameters of the preset model may be updated based on an output result. The types of the labeled training data may include: an image data type, a text data type, or an audio data type.

After the model parameters of the preset model are updated, labeled verification data in a verification set may be input into the preset model after the model parameters are updated, and a first prediction label can be obtained. Then, a verification loss value of the preset model in the verification set after the model parameters are updated may be obtained based on a difference between the first prediction label and a marked label of the labeled verification data based on a preset loss function. Here, the preset loss function may be an algorithm for measuring the quality of a prediction result output by the preset model. The types of the verification data may include: an image data type, a text data type, or an audio data type. In an implementation process, firstly, a first label vector value of the first prediction label and a marked label vector value of the marked label may be obtained, the first label vector value and the marked label vector value may be input into the preset loss function, and a difference between the first label vector value and the marked label vector value may be calculated based on the preset loss function to obtain the verification loss value.

In the embodiments of the disclosure, the model parameters of the preset model may be reversely adjusted based on the preset loss function constructed in advance, such as a gradient descent method, to make the model converge, that is, to make the finally obtained model better. The selection of a loss function also may have impact on the quality of the model to a certain extent. The preset loss function may include: a binary mutual entropy loss function and a cross entropy loss function.

In the embodiments of the disclosure, current structural parameters of the preset model after the model parameters are updated may be obtained. An auxiliary loss value may be determined based on the current structural parameters. Whether to stop training the preset model may be determined based on the verification loss value and the auxiliary loss value. In other optional embodiments, the accuracy of the trained preset model may be verified based on a preset verification set, and when the accuracy reaches the preset accuracy, the preset model may be stopped from being trained.

In the embodiments of the disclosure, the auxiliary loss value may be determined based on the current structural parameters of the preset model, and whether to stop training the preset model may be determined based on the verification loss value and the auxiliary loss value together.

Here, the auxiliary loss value may be determined based on an auxiliary loss function. Since the output result of the auxiliary loss function is positively correlated with the preset weight coefficient, under the condition that the current structural parameters are determined, the size of the auxiliary loss value may be adjusted by adjusting the size of the weight coefficient. That is, the larger the weight coefficient, the larger the auxiliary loss value; and the smaller the weight coefficient, the smaller the auxiliary loss value.

Since the auxiliary loss value in the embodiments of the disclosure is associated with current structural parameters and the weight coefficient, in the process of training the preset model, the current structural parameters may change with the training process. Under the condition that the current structural parameters change, if there is a bias in the output result of the preset model, the auxiliary loss value may be adjusted through the weight coefficient, and an output result of the preset model may be adjusted based on the adjusted auxiliary loss value, thereby reducing the discretization bias of the output result. In the embodiments of the disclosure, after the auxiliary loss value is increased, in addition to optimizing the network parameters and structural parameters in the process of optimizing the preset model, the value of the output result may also be moved to the derivative direction of the auxiliary loss value, and then, each output result may approach a preset parameter value, such as 0 or 1, thereby reducing the discretization bias of the output results. Therefore, the accuracy of the trained model is higher, and the classification result obtained by classifying the target network model constructed based on the network structure included in the trained preset model is more accurate.

In other optional embodiments, the method may further include:
the current structural parameters of the preset model after the model parameters are updated are normalized based on an activation function and current normalized structural parameters are obtained.

The operation in which the auxiliary loss value is determined based on the current structural parameters of the preset model may include:
the auxiliary loss value is determined based on the current normalized structural parameters.

Here, the structural parameters may include a node weight of each network structure included in the preset model, the number of layers of each network structure included in the preset model, and the like. When the network structure included in the preset model is a structure capable of forming a convolutional neural network, the structural parameters may also be the size of each filter (a convolution kernel). In the embodiments of the disclosure, the activation function may include a softmax function, a Sigmoid function, and the like. In the embodiments of the disclosure, the current structural parameters of the preset model after the model parameters are updated may be normalized based on an activation function, and current normalized structural parameters may obtained. Taking the activation function as the softmax function as an example, the formula for normalizing the current structural parameters includes:

$$\text{soft max}(\alpha_i) = \exp(\alpha_i)/\Sigma_j^M \exp(\alpha_j) \quad (1)$$

In the formula (1), $\Sigma_i \text{ soft max}(\alpha_i)=1$, wherein soft max $(\alpha_j)$ represents current normalized structural parameters, $\alpha_i$ represents current structural parameters, and i, j and M are positive integers.

Taking the activation function as the Sigmoid function as an example, the formula for normalizing current structural parameters includes:

$$\sigma(\alpha_i) = 1/(1+\exp(-\alpha_i)) \quad (2)$$

In the formula (2), $\sigma(\alpha_i)$ represents the current normalized structural parameters, $\alpha_i$ represents current structural parameters, and i is a positive integer.

Taking the updated model parameters as network parameters as an example, the current structural parameters of the preset model after the network parameters are updated may be obtained, the current structural parameters may be normalized to obtain current normalized structural parameters, and then, an auxiliary loss value may be determined based on the current normalized structural parameters.

In the embodiments of the disclosure, after the current structural parameters are determined, the auxiliary loss value may be determined based on the current structural parameters. By associating the current structural parameters with the auxiliary loss value, when the structural parameters need to be updated subsequently based on the auxiliary loss value, the values of the structural parameters to be updated may be moved to the reciprocal direction of the auxiliary loss value, so that the updated structural parameters approach a preset structural parameter value so as to improve the accuracy of model training.

In other optional embodiments, the operation in which whether to stop training the preset model is determined based on the verification loss value and the auxiliary loss value may include:
a weighted sum of the verification loss value and the auxiliary loss value is determined based on the verification loss value, the auxiliary loss value and a weight coefficient to obtain a total loss value of the preset model; and
training the preset model is stopped in response to a change of the total loss value within a preset duration being less than a preset change threshold.

Here, the operation in which the weighted sum of the verification loss value and the auxiliary loss value is determined based on the verification loss value, the auxiliary loss value, and the weight coefficient to obtain the total loss value of the preset model may include: a product value of the auxiliary loss value, and the weight coefficient is determined; and the product value and the verification loss value are added to obtain the total loss value.

In other optional embodiments, the weight coefficient may be obtained based on a grid search algorithm in experiments.

The calculation formula of the total loss value includes:

$$L_{total} = L_{val}(W^*(\alpha), \alpha) + W_{0-1} L_{0-1} \quad (3)$$

In the formula (3), $L_{total}$ represents the total loss value, $L_{val}(W^*(\alpha), \alpha)$ represents the verification loss value, $W_{0-1}$ represents the weight coefficient, and $L_{0-1}$ represents the auxiliary loss value.

The formula for calculating the auxiliary loss value based on a first auxiliary loss function includes:

$$L_{0-1} = -\frac{1}{N}\sum_i^N (\sigma(\alpha_i) - 0.5)^2 \quad (4)$$

In the formula (4), $L_{0-1}$ represents the auxiliary loss value, $\sigma(\alpha_i)$ represents the current normalized structural parameters, $\alpha_i$ represents the current structural parameters, and i and N are positive integers.

In other optional embodiments, the formula for calculating the auxiliary loss value based on a second auxiliary loss function further includes:

$$L'_{0-1} = -\frac{1}{N}\sum_i^N |\sigma(\alpha_i) - 0.5| \quad (5)$$

Figure 2:
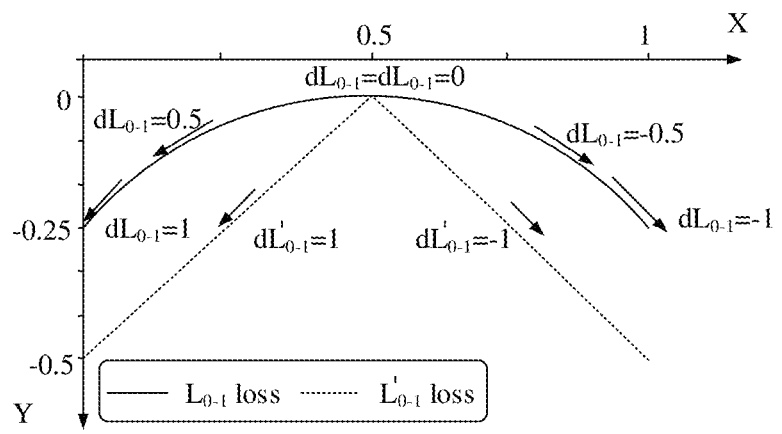
FIG. 2 is a schematic diagram of a first auxiliary loss function and a second auxiliary loss function and derivative directions thereof according to an exemplary embodiment.

In the formula (5), $L_{0-1}$ represents the auxiliary loss value, $\sigma(\alpha_i)$ represents the current normalized structural parameters, $\alpha_i$ represents the current structural parameters, and i and N are positive integers. FIG. 2 is a schematic diagram of a first auxiliary loss function and a second auxiliary loss function and derivative directions thereof according to an exemplary embodiment. The X axis represents the current structural parameters, and the Y axis represents derivative values of the first auxiliary loss function and the second auxiliary loss function.

In the embodiments of the disclosure, the auxiliary loss value may be determined based on the current structural parameters of the preset model. The total loss value may be determined based on the verification loss value, the auxiliary loss value, and the weight coefficient. Whether to stop training the preset model may be determined based on the total loss value. After the auxiliary loss value is increased, in the process of optimizing the preset model, a value of each output result may be moved to the derivative direction of the auxiliary loss value, and then, each output result may approach a preset parameter value, thereby reducing the discretization bias of the each output result.

In other optional embodiments, the operation in which the data to be classified is classified based on the target network model constructed by the network structure included in the trained preset model after stopping training the preset model to obtain the classification result may include:

the structural parameters in the trained preset model are normalized based on an activation function after stopping training the preset model to obtain normalized structural parameters;

a network structure with the normalized structural parameters with values greater than a preset parameter threshold is determined from the trained preset model;

a target network model is formed based on the network structure with the normalized structural parameters with values greater than the preset parameter threshold; and the data to be classified is classified based on the target network model to obtain the classification result.

Here, the activation function may include a softmax function, a Sigmoid function, and the like. Taking the process of normalizing each of the structural parameters in the trained preset model based on the Sigmoid function as an example, in the process of normalizing the structural parameters based on the Sigmoid function, the structural parameters are independent of each other, so the normalized structural parameters corresponding to the structural parameters may be obtained respectively. Then, whether the values of the normalized structural parameters are greater than a preset parameter threshold is determined. When the values of the normalized structural parameters are greater than the preset parameter threshold, the network structure corresponding to the normalized structural parameters is determined as a structure for forming the target network model.

In other optional embodiments, the method may further include: performance evaluation is performed on the trained preset model based on a test data set to obtain an evaluation result. The test data in the test data set may have at least one of the following types: an image data type, a service data type, or an audio data type.

Here, after the trained preset model is formed, the performance of the trained preset model may be evaluated on the test data set so as to gradually optimize the network structure until an optimal preset model, such as a preset model with minimized verification loss or maximized reward, is found. Here, the test data in the test data set may be input into the trained preset model, an evaluation result may be output through the preset model, then the output evaluation result is compared with a preset standard to obtain a comparison result, and the performance of the preset model can be evaluated based on the comparison result. The test result may be a speed or accuracy of the preset model for processing the test data.

The trained preset model may have a plurality of network layers. There may be one or a plurality of network structures with the normalized structural parameters with values greater than the preset parameter threshold in each network layer. When there is one network structure with a normalized structural parameter value greater than the preset parameter threshold in the network layer, the network structure may be directly connected to an output end of the previous layer and an input end of the next layer of the network layer. When there are a plurality of network structures with the normalized structural parameter values greater than the preset parameter threshold in the network layer, the functions that represent each network structure may be added to obtain a new network structure for the network layer, and the new network structure may be connected to the output end of the previous layer and the input end of the next layer of the network layer. In the embodiments of the disclosure, after the network structures of the network layers are connected, the target network model is formed. In the embodiments of the disclosure, after the target network model is formed, the data to be classified may be classified based on the target network model to obtain the classification result.

In other optional embodiments, the operation in which the data to be classified is classified based on the target network model constructed by the network structure included in the trained preset model and the classification result is obtain may include: the data to be classified are input into the target network model, and M class probabilities of the data to be classified in M classes are output. Class labels corresponding to a first preset number of class probabilities in the M class probabilities are the classification result of the data to be classified. The data to be classified may have at least one of the following types: an image data type, a text data type, or an audio data type. In other optional embodiments, the model parameters may further include network parameters. The operation in which labeled training data in the training set are input into the preset model to be trained, and the model parameters of the preset model are updated may include:

the labeled training data in the training set are input into the preset model to be trained to obtain a second prediction label;

a training loss value is obtained based on a difference between the second prediction label and the marked label of the labeled training data;

the network parameters of the preset model are updated based on the training loss value; and the labeled verification data in the verification set are input into the preset model after the network parameters are updated to update the structural parameters.

Here, the labeled training data in the training set may be input into the preset model after the model parameters are updated to obtain the second prediction label. Then, the training loss value of the preset model in the training set may be obtained based on the difference between the second prediction label and the marked label of the labeled training data based on a preset loss function. Here, the preset loss function may be an algorithm for measuring the quality of the prediction result output by the preset model. In the embodiments of the disclosure, the model parameters of the preset model may be reversely adjusted based on the preset loss function constructed in advance, such as a gradient descent method, to make the model converge, that is, to make the finally obtained model better. The selection of a loss function also may impact the quality of the model to a certain extent. The preset loss function may include a binary mutual entropy loss function and a cross entropy loss function.

After the training loss value is determined, the network parameters of the preset model may be adjusted based on the training loss value through the gradient descent method. After the network parameters of the preset model are updated, the labeled verification data in the verification set may be input into the preset model after the network parameters are updated to update the structural parameters.

In other optional embodiments, the operation in which the labeled verification data in the verification set are input into the preset model after the network parameters are updated to update the structural parameters may include: the labeled verification data in the verification set are input into the preset model after the network parameters are updated to obtain a third prediction label; an updating loss value is obtained based on a difference between the third prediction label and the marked label of the labeled verification data; an auxiliary loss value is determined based on the current structural parameters of the preset model; and the structural parameters in the preset model after the network parameters are updated are updated based on the updating loss value and the auxiliary loss value.

In the embodiments of the disclosure, the auxiliary loss value may be determined based on the current structural parameters of the preset model, and the structural parameters in the preset model after the network parameters are updated may be updated based on the updating loss value and the auxiliary loss value. After the auxiliary loss value is increased, in the process of optimizing the preset model, in addition to optimizing the network parameters, the values of the structural parameters may also be moved to the derivative direction of the auxiliary loss value, and then, the structural parameters may approach a preset parameter value, such as 0 or 1, thereby reducing the discretization bias of the structural parameters so as to enable the network structure after being subjected to discretization and before being subjected to discretization to have similar expressive abilities.

In other optional embodiments, the method may further include: the model parameters of the preset model to be trained are initialized to obtain initialized parameters. The operation in which the model parameters of the preset model to be trained are initialized to obtain the initialized parameters may include: initialization input is detected; and the model parameters of the preset model to be trained are initialized based on the initialization input to obtain the initialized parameters.

Here, taking the method involved in the embodiments of the disclosure being executed on a terminal device as an example, the initialization input may be detected by the terminal device. When the initialization input is detected, the model parameters of the preset model to be trained may be initialized based on the initialization input to obtain corresponding initialized parameters. That is, the model parameters of the preset model to be trained may be assigned with default values. Thus, before the preset model is trained, the normal operation of the preset model to be trained may also be ensured.

The technical solution in any one of the above embodiments of the disclosure may be applied to Neural Architecture Search (NAS). The NAS is a technology that automatically designs a neural network. Based on the NAS, a high-performance neural network structure may be automatically designed according to a sample set, which may effectively reduce the use and implementation cost of the neural network. In the process of searching based on the NAS, a super-network including a plurality of network structures may be trained to generate a super-network including a search space of all network structures, that is, a set of candidate neural network structures. The network structure is a part of the neural network.

In Differentiable Architecture Search (DARTS), a method of training a super-network including a search space of all network structures may be adopted. The super-network may be formed by stacking a plurality of searchable cells in a certain order, and the cells may include normal cells and reduction cells. Each cell is a Directed Acyclic Graph (DAG). Each cell has N nodes. There may be M optional network structures between any two nodes. Each network structure may include two types of parameters: structural parameters α and network parameters W. The M structural parameters may be constrained by a softmax function and impact each other. Here, the super-network may be trained in a cross training manner, that is, the structural parameters and the network parameters are cross-updated. After the super-network training converges, the network structure with the maximum output value of the softmax function may be selected as a network structure for forming the target network model.

Figure 3:
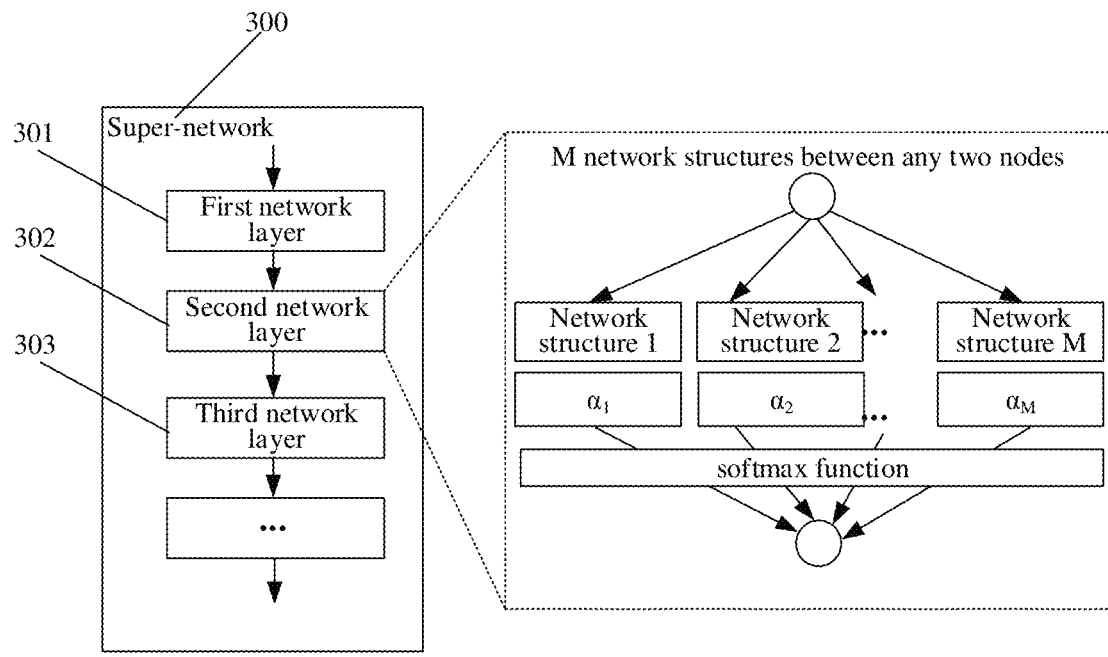
FIG. 3 is a schematic structural diagram of a super-network according to an exemplary embodiment.

FIG. 3 is a schematic structural diagram of a super-network 300 according to an exemplary embodiment. As shown in FIG. 3, the super-network 300 includes a first network layer 301, a second network layer 302, a third network layer 303 and so on. M parallel network structures are respectively included between any two nodes in the first network layer 301, the second network layer 302, the third network layer 303 and so on, and are respectively network structure 1, network structure 2 . . . and network structure M. M structural parameters corresponding to the M parallel network structures are respectively $\alpha_1, \alpha_2 \ldots \alpha_M$, and the M structural parameters are constrained by the softmax function.

In other optional embodiments, searching for a network structure may also be performed based on Fair Differentiable Architecture Search (Fair DARTS). In the process of performing a network search based on the Fair DARTS, a sigmoid function may be used to replace the softmax function. M structural parameters are normalized respectively, so that the structural parameters can be independent of each other. After the super-network training converges, the network structure with an output value of the sigmoid function being greater than the preset parameter threshold may be selected as a network structure for forming the target network model.

Figure 4:
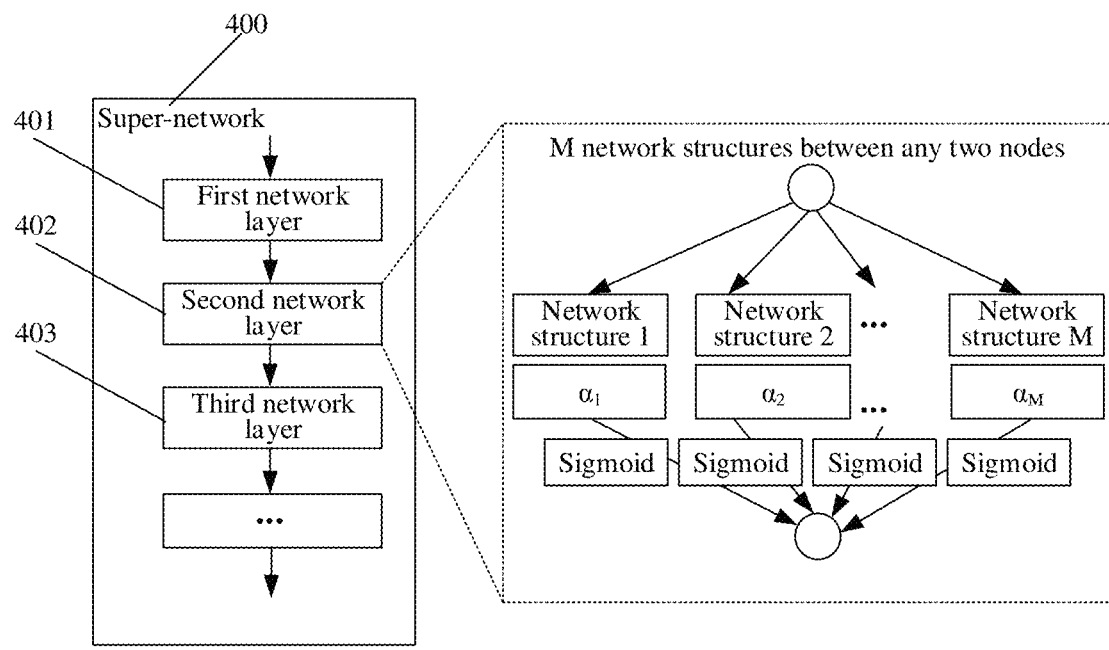
FIG. 4 is a schematic structural diagram of another super-network according to an exemplary embodiment.

FIG. 4 is a schematic structural diagram of another super-network 400 according to an exemplary embodiment. As shown in FIG. 4, the super-network 400 includes a first network layer 401, a second network layer 402, a third network layer 403 and so on. M parallel network structures are respectively included between any two nodes in the first network layer 401, the second network layer 402, the third network layer 403 and so on, and are respectively network structure 1, network structure 2 . . . and network structure M. M structural parameters corresponding to the M parallel network structures are respectively $\alpha_1, \alpha_2 \ldots \alpha_M$, and each of the structural parameters is respectively restricted by the sigmoid function.

The above two manners of determining a network structure for forming the target network model based on structural parameters are discretized operations. For example, when a value of an output result based on the softmax function or the sigmoid function is 0.8, it can be determined that the value is approximately 1, that is, there is a discretization bias. In the embodiments of the disclosure, an auxiliary loss value may be determined based on current structural parameters of the preset model, and structural parameters in the preset model after the network parameters are updated may be updated based on an updating loss value and the auxiliary loss value. After the auxiliary loss value is increased, in the process of optimizing the preset model, in addition to optimizing the network parameters, the values of structural parameters may also be moved to the derivative direction of the auxiliary loss value, and then, the structural parameters may approach a preset parameter value, such as 0 or 1, thereby reducing the discretization bias of the structural parameters and enabling the network structure after being subjected to discretization and before being subjected to discretization to have similar expressive abilities.

The preset model in the embodiments of the disclosure is not limited to deep learning models in tasks, such as image classification, target detection, semantic segmentation, text-to-speech, natural language translation, speech enhancement, and speech recognition. In the process of model training, the discretization bias may be reduced in the fair differentiable neural network search, thereby obtaining a better neural network structure.

Figure 5:
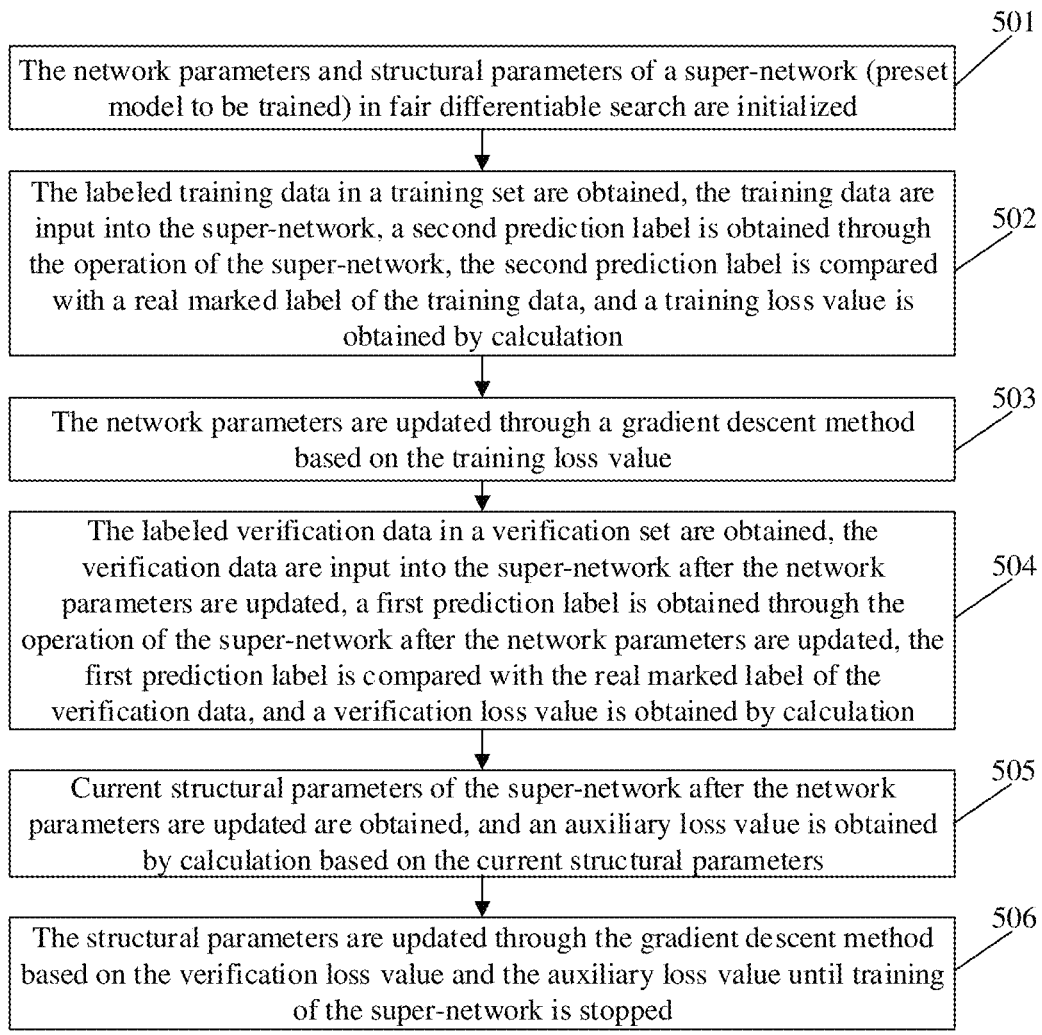
FIG. 5 is a schematic flow diagram of another method for data processing according to an exemplary embodiment.

FIG. 5 is a schematic flow diagram of another method for data processing according to an exemplary embodiment. As shown in FIG. 5, the method includes the following operations.

In operation 501, the network parameters and structural parameters of a super-network (preset model to be trained) in fair differentiable search are initialized.

In operation 502, the labeled training data in a training set are obtained, the training data are input into the super-network, a second prediction label is obtained through the operation of the super-network, the second prediction label is compared with a real marked label of the training data, and a training loss value is obtained by calculation.

In operation 503, the network parameters are updated through a gradient descent method based on the training loss value.

In operation 504, the labeled verification data in a verification set are obtained, the verification data are input into the super-network after the network parameters are updated, a first prediction label is obtained through the operation of the super-network after the network parameters are updated, the first prediction label is compared with the real marked label of the verification data, and a verification loss value is obtained by calculation.

In operation 505, current structural parameters of the super-network after the network parameters are updated are obtained, and an auxiliary loss value is obtained by calculation based on the current structural parameters.

In operation 506, the structural parameters are updated through the gradient descent method based on the verification loss value and the auxiliary loss value until training of the super-network is stopped.

In other optional embodiments, all the structural parameters in the trained super-network are normalized based on an activation function after training of the super-network is stopped to obtain normalized structural parameters. A network structure with a normalized structural parameter with a value greater than a preset parameter threshold may be selected as a network structure for forming the target network model. Taking the activation function as the Sigmoid function as an example, a network structure with an output value of the sigmoid function of the structural parameters in the trained super-network being greater than the preset parameter threshold may be selected as a network structure in the target network model. In other optional embodiments, after the target network model is constructed, the target network model may be retrained, and the trained target network model may be deployed in an actual deep learning task.

Figure 6:
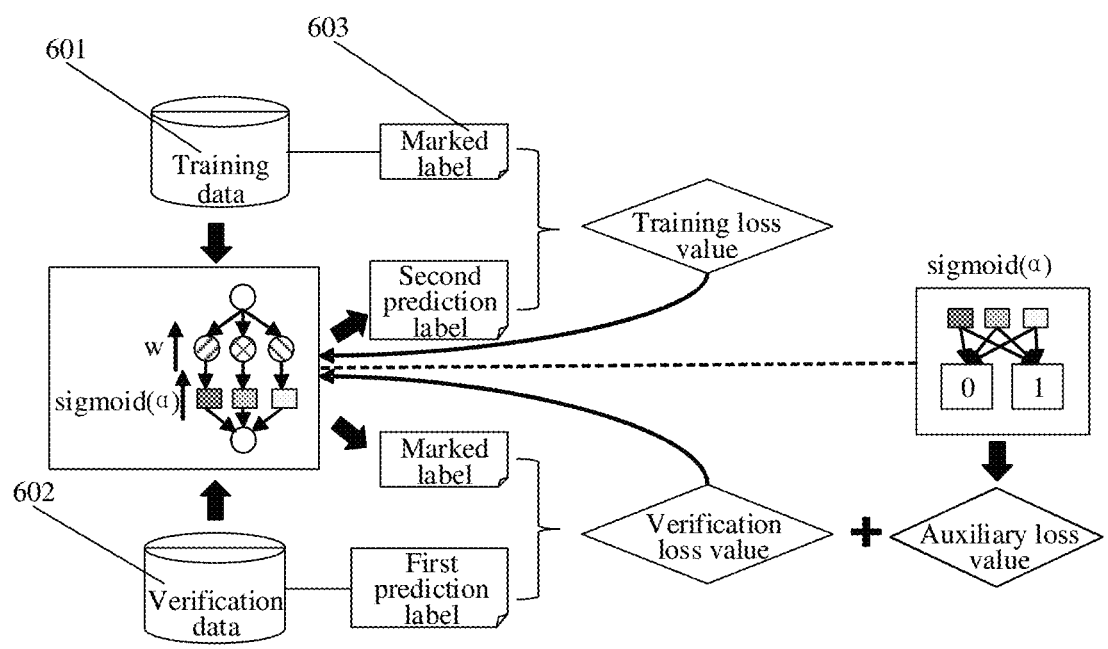
FIG. 6 is a schematic diagram of a search process of a fair differentiable neural network based on auxiliary loss function according to an exemplary embodiment.

FIG. 6 is a schematic diagram of a search process of a fair differentiable neural network based on auxiliary loss function according to an exemplary embodiment. As shown in FIG. 6, taking an image classification task as an example, training data 601 and verification data 602 (both are images) and corresponding real marked labels 603 (image categories) are given.

In an implementation process, the training data may be input into a super-network, a second prediction label may be obtained through operation of the super-network, the second prediction label may be compared with the real marked label of the training data, and a training loss value may be obtained by calculation. Network parameters may be updated based on a gradient descent method according to the training loss value. The verification data may be input into the super-network after the network parameters are updated. A first prediction label may be obtained through the operation of the super-network after the network parameters are updated. The first prediction label may be compared with the real marked label of the verification data. A verification loss value may be obtained by calculation. Current structural parameters of the super-network after the network parameters are updated may be obtained, and an auxiliary loss value may be obtained by calculation based on the current structural parameters. The structural parameters may be updated through the gradient descent method based on the verification loss value and the auxiliary loss value until training of the super-network is stopped.

All the structural parameters in the trained super-network are normalized based on a Sigmoid function after training of the super-network is stopped to obtain normalized structural parameters. A network structure with a normalized structural parameter value greater than the preset parameter threshold may be selected as a network structure in the target network model. Searching for the target network model for processing image tasks based on the method provided by the embodiments of the disclosure can reduce an error between the prediction label output by the target network model and a real label.

In the search process of the fair differentiable neural network architecture of the disclosure, after current structural parameters are determined, an auxiliary loss value may be determined based on the current structural parameters. By associating the current structural parameters with the auxiliary loss value, when the structural parameters need to be updated subsequently based on the auxiliary loss value, the values of the structural parameters to be updated may be moved to the reciprocal direction of the auxiliary loss value, so that the updated structural parameters approach a preset structural parameter value, such as 0 or 1, so as to improve the accuracy of model training.

The embodiments of the disclosure propose a method for reducing the discretization bias of a neural network in a search process of the fair differentiable neural network. An auxiliary loss function for controlling structural parameters may be added to control an optimization process. The auxiliary loss function may enable values of the structural parameters subjected to the sigmoid function operation to approach the discretized 0 or 1, thereby reducing the discretization bias of the neural network structure and making the finally searched neural network structure better.

Figure 7:
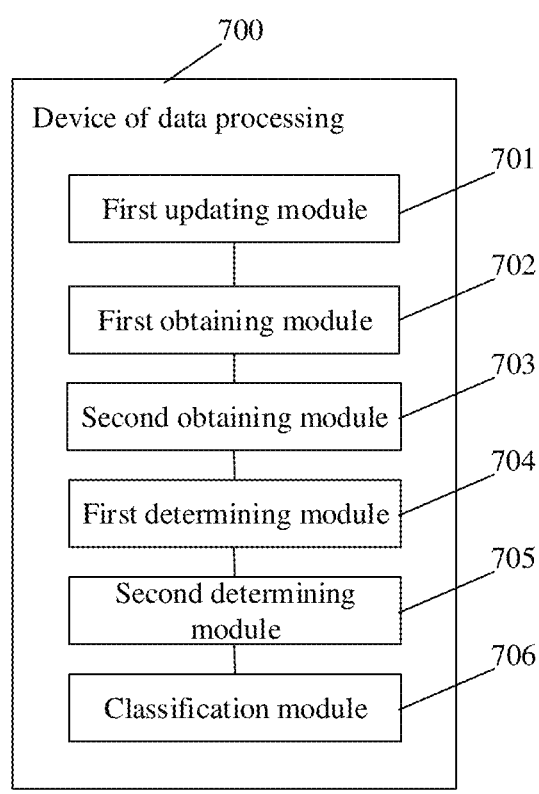
FIG. 7 is a block diagram of a device for data processing according to an exemplary embodiment.

FIG. 7 is a block diagram of a device 700 for data processing according to an exemplary embodiment. As shown in FIG. 7, the device 700 for data processing includes:
- a first updating module 701 configured to input labeled training data in a training set into a preset model to be trained and update model parameters of the preset model, the model parameters including structural parameters;
- a first obtaining module 702 configured to input labeled verification data in a verification set into the preset model after the model parameters are updated to obtain a first prediction label;
- a second obtaining module 703 configured to obtain a verification loss value based on a difference between the first prediction label and a marked label of the labeled verification data;
- a first determining module 704 configured to determine an auxiliary loss value based on current structural parameters of the preset model;
- a second determining module 705 configured to determine whether to stop training the preset model based on the verification loss value and the auxiliary loss value; and
- a classification module 706 configured to classify data to be classified based on a target network model constructed by a network structure included in the trained preset model after stopping training the preset model to obtain classification result.

In other optional embodiments, the device 700 may further include:
- a first processing module configured to normalize the current structural parameters of the preset model after the model parameters are updated based on an activation function and obtain current normalized structural parameters.

The first determining module 704 is further configured to:
determine the auxiliary loss value based on the current normalized structural parameters.

In other optional embodiments, the second determining module 705 is further configured to:
- determine a weighted sum of the verification loss value and the auxiliary loss value based on the verification loss value, the auxiliary loss value and a weight coefficient to obtain a total loss value of the preset model; and
- stop training the preset model in response to a change of the total loss value within a preset duration being less than a preset change threshold.

In other optional embodiments, the device 700 may further include:
- a second processing module configured to normalize the structural parameters in the trained preset model based on an activation function after stopping training the preset model to obtain normalized structural parameters;
- a third determining module configured to determine, from the trained preset model, a network structure with the normalized structural parameters with values greater than a preset parameter threshold;
- a forming module configured to form the target network model based on the network structure with the normalized structural parameters with values greater than the preset parameter threshold; and
- a classification module configured to classify the data to be classified based on the target network model to obtain the classification result.

In other optional embodiments, the classification module is further configured to:
input the data to be classified into the target network model and output M class probabilities of the data to be classified in M classes.

Class labels corresponding to a first preset number of class probabilities in the M class probabilities are the classification result of the data to be classified.

The type of the data to be classified may include at least one of the following: an image data type, a text data type, or an audio data type.

In other optional embodiments, the model parameters may further include network parameters. The first updating module 701 is further configured to:
- input the labeled training data in the training set into the preset model to be trained to obtain a second prediction label;
- obtain a training loss value based on a difference between the second prediction label and the marked label of the labeled training data;
- update the network parameters of the preset model based on the training loss value; and
- input the labeled verification data in the verification set into the preset model after the network parameters are updated to update the structural parameters.

With respect to the device in the above embodiment, the specific manners for performing operations for individual modules therein have been described in detail in the embodiment regarding the method and will not be further elaborated upon herein.

Figure 8:
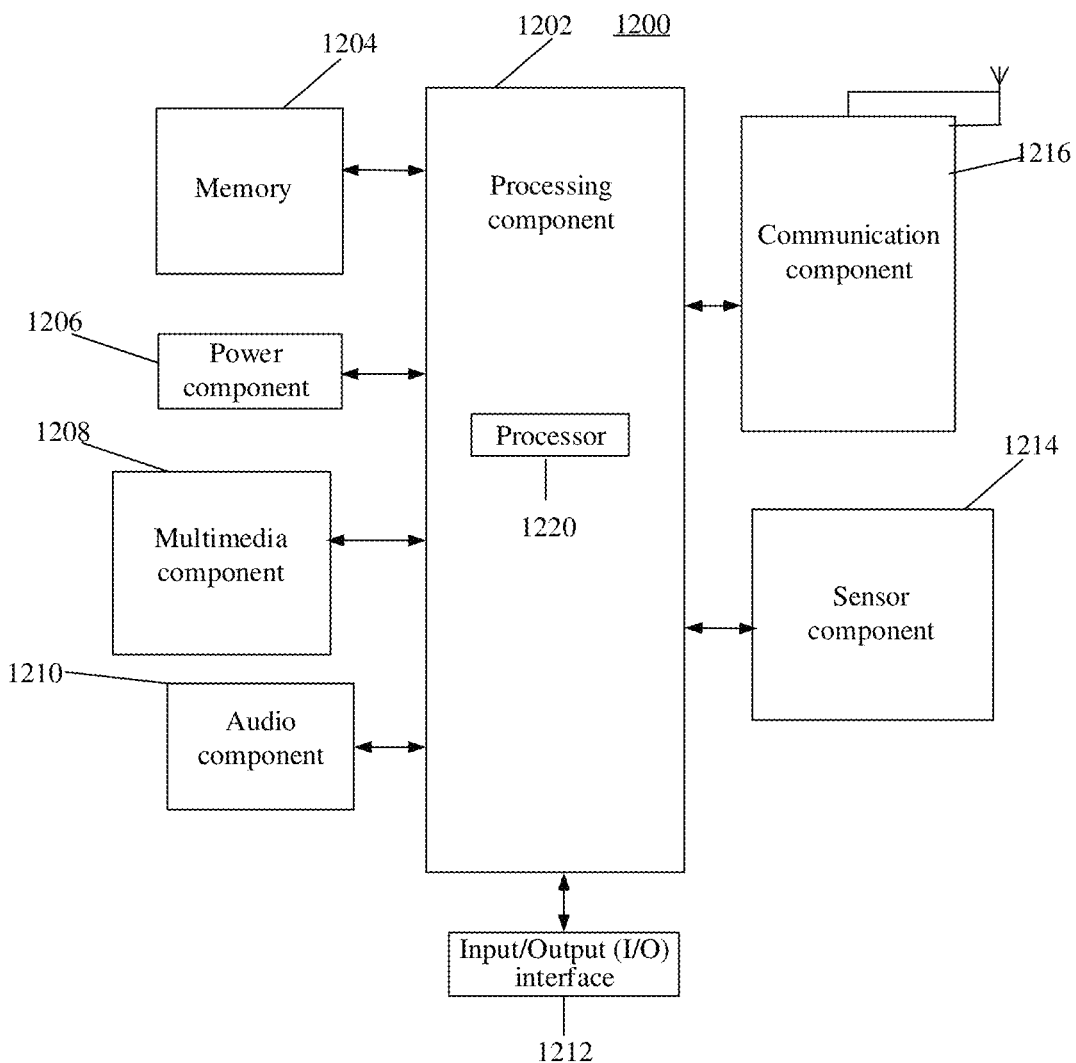
FIG. 8 is a block diagram of a device for data processing according to an exemplary embodiment.

FIG. 8 is a block diagram of a device 1200 for data processing according to an exemplary embodiment. For example, the device 1200 may be a mobile phone, a computer, a digital broadcast terminal, a message receiving and sending device, a game console, a tablet device, a medical device, a fitness device, a personal digital assistant, and the like.

Referring to FIG. 8, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to complete all or part of the operations in the above method. Moreover, the processing component 1202 may include one or more modules to facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation on the device 1200. Examples of such data include instructions for any applications or methods operated on the device 1200, contact data, phone book data, messages, pictures, videos, etc. The memory 1204 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, slides, and gestures on the TP. The touch sensors may not only sense a boundary of a touch or slide action, but also sense a period of time and a pressure associated with the touch or slide action. In some embodiments, the multimedia component 1208 includes a front camera and/or a rear camera. The front camera and/or the rear camera may receive external multimedia data while the device 1200 is in an operation mode, such as a photographing mode or a video mode. Each of the front camera and the rear camera may be a fixed optical lens system or may have focus and optical zoom capabilities.

The audio component 1210 is configured to output and/or input audio signals. For example, the audio component 1210 includes a microphone (MIC) configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. These buttons may include, but are not limited to, a home button, a volume button, a starting button, and a locking button.

The sensor component 1214 includes one or more sensors configured to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a complementary metal-oxide-semiconductor (CMOS) or charge-coupled device (CCD) image sensor, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as WiFi, 2G, or 3G, or a combination thereof. In an exemplary embodiment, the communication component 1216 receives a broadcast signal or broadcast associated information from an external broadcast management system via a broadcast channel. In an exemplary embodiment, the communication component 1216 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an exemplary embodiment, the device 1200 may be implemented with one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a micro-controller, a microprocessor, or other electronic components, for performing the above method.

In an exemplary embodiment, the disclosure also provides a non-transitory computer readable storage medium including instructions, such as the memory 1204 including instructions, and the instructions may be executed by the processor 1220 of the device 1200 to complete the above method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

A non-transitory computer-readable storage medium is provided. When instructions in the storage medium are executed by a processor of a mobile terminal, the mobile terminal may perform a method for data processing. The method includes:

inputting labeled training data in a training set into a preset model to be trained and updating model parameters of the preset model, wherein the model parameters comprise structural parameters;

inputting labeled verification data in a verification set into the preset model after the model parameters are updated to obtain a first prediction label;

obtaining a verification loss value based on a difference between the first prediction label and a marked label of the labeled verification data;

determining an auxiliary loss value based on current structural parameters of the preset model;

determining whether to stop training the preset model based on the verification loss value and the auxiliary loss value; and classifying data to be classified based on a target network model constructed by a network structure included in the trained preset model after stopping training the preset model, to obtain a classification result.

Figure 9:
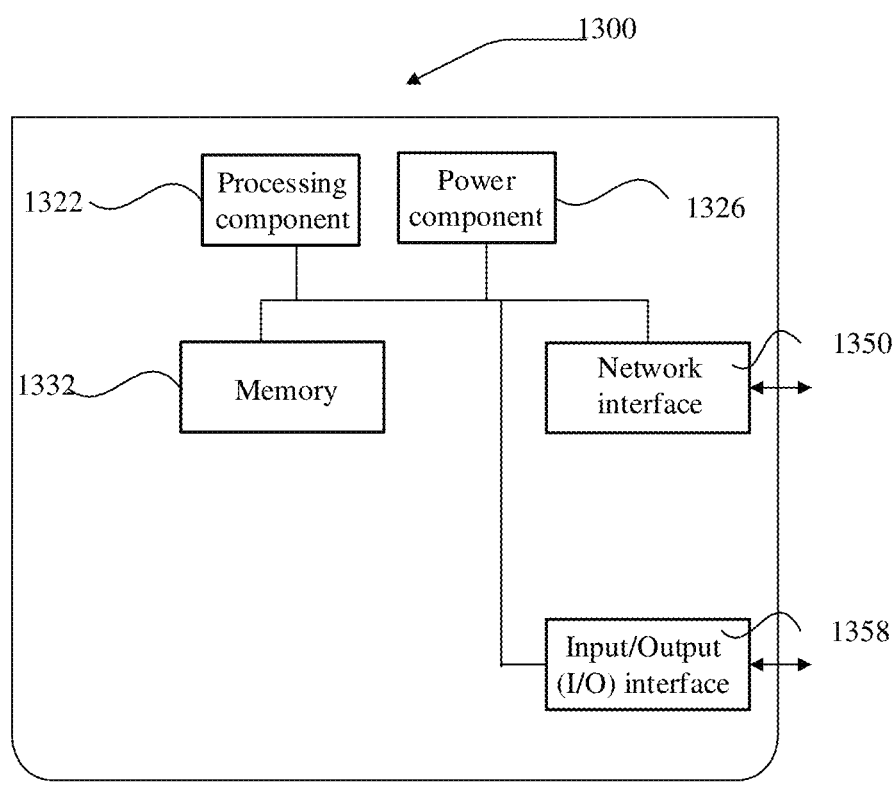
FIG. 9 is a block diagram of another device for data processing according to an exemplary embodiment.

FIG. 9 is a block diagram of another device 1300 for data processing according to an exemplary embodiment. For example, the device 1300 may be provided as a server. Referring to FIG. 9, the device 1300 includes a processing component 1322, further including one or more processors and memory resources represented by a memory 1332 for storing instructions capable of being executed by the processing component 1322, such as application programs. The application program stored in the memory 1332 may include one or more modules each of which corresponds to a set of instructions. Furthermore, the processing component 1322 is configured to execute the instructions to perform the above method for data processing. The method includes:

inputting labeled training data in a training set into a preset model to be trained and updating model parameters of the preset model, wherein the model parameters comprise structural parameters;

inputting labeled verification data in a verification set into the preset model after the model parameters are updated to obtain a first prediction label;

obtaining a verification loss value based on a difference between the first prediction label and a marked label of the labeled verification data;

determining an auxiliary loss value based on current structural parameters of the preset model;

determining whether to stop training the preset model based on the verification loss value and the auxiliary loss value; and classifying data to be classified based on a target network model constructed by a network structure included in the trained preset model after stopping training the preset model, to obtain a classification result.

The device 1300 may also include a power component 1326 configured to perform power management of the device 1300, a wired or wireless network interface 1350 configured to connect the device 1300 to the network, and an Input/Output (I/O) interface 1358. The device 1300 may be operated based on an operating system stored in the memory 1332, such as Windows Server®, Mac OS X®, Unix®, Linux®, FreeBSD® or the like.

The technical solutions provided by the embodiments of the disclosure may have the following beneficial effects.

An auxiliary loss value may be determined based on current structural parameters of a preset model, and whether to stop training the preset model may be determined based on a verification loss value and the auxiliary loss value together. After the auxiliary loss value is increased, in the process of optimizing the preset model, in addition to optimizing network parameters and structural parameters, a value of an output result may also be moved to a derivative direction of the auxiliary loss value, and then, each output result may approach a preset parameter value, such as 0 or 1, thereby reducing the discretization bias of the output results. Therefore, the accuracy of the trained model is higher, and a classification result obtained based on the trained model is more accurate.

Other embodiments of the disclosure will be apparent to those skilled in the art from consideration of the specification and practice of the disclosure here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for data processing, comprising:
   inputting labeled training data in a training set into a preset model to be trained and updating model parameters of the preset model, wherein the model parameters comprise structural parameters;

inputting labeled verification data in a verification set into the preset model after the model parameters are updated to obtain a first prediction label;

obtaining a verification loss value based on a difference between the first prediction label and a marked label of the labeled verification data;

determining an auxiliary loss value based on current structural parameters of the preset model;

determining whether to stop training the preset model based on the verification loss value and the auxiliary loss value to obtain a trained preset model;

normalizing the structural parameters in the trained preset model based on an activation function after stopping training the preset model to obtain normalized structural parameters;

determining, from the trained preset model, a network structure comprised in the trained preset model with the normalized structural parameters with values greater than a preset parameter threshold;

forming a target network model based on the network structure with the normalized structural parameters with values greater than the preset parameter threshold; and classifying data to be classified based on the target network model to obtain a classification result.

2. The method of claim 1, further comprising:
   normalizing the current structural parameters of the preset model with the model parameters being updated based on an activation function and obtaining current normalized structural parameters;

wherein the determining an auxiliary loss value based on current structural parameters of the preset model comprises:
      determining the auxiliary loss value based on the current normalized structural parameters.

3. The method of claim 1, wherein the determining whether to stop training the preset model based on the verification loss value and the auxiliary loss value to obtain a trained preset model comprises:
   determining a weighted sum of the verification loss value and the auxiliary loss value based on the verification loss value, the auxiliary loss value, and a weight coefficient to obtain a total loss value of the preset model; and stopping training the preset model in response to a change of the total loss value within a preset duration being less than a preset change threshold.

4. The method of claim 1, wherein the classifying data to be classified based on the target network model to obtain a classification result comprises:
   inputting the data to be classified into the target network model, and outputting M class probabilities of the data to be classified in M classes, wherein class labels corresponding to a first preset number of class probabilities in the M class probabilities are the classification result of the data to be classified; and wherein the data to be classified have at least one of following types: an image data type, a text data type, or an audio data type.

5. The method of claim 1, wherein the model parameters further comprise network parameters;
   the inputting labeled training data in a training set into a preset model to be trained and updating model parameters of the preset model comprises:

inputting the labeled training data in the training set into the preset model to be trained to obtain a second prediction label;
obtaining a training loss value based on a difference between the second prediction label and a marked label of the labeled training data;
updating the network parameters of the preset model based on the training loss value; and
inputting the labeled verification data in the verification set into the preset model after the network parameters are updated to update the structural parameters.

6. A device for data processing, comprising:
a processor; and
a memory configured to store instructions executable by the processor,
wherein the processor is configured to:
input labeled training data in a training set into a preset model to be trained and update model parameters of the preset model, wherein the model parameters comprise structural parameters;
input labeled verification data in a verification set into the preset model after the model parameters are updated to obtain a first prediction label;
obtain a verification loss value based on a difference between the first prediction label and a marked label of the labeled verification data;
determine an auxiliary loss value based on current structural parameters of the preset model;
determine whether to stop training the preset model based on the verification loss value and the auxiliary loss value to obtain a trained preset model;
normalize the structural parameters in the trained preset model based on an activation function after stopping training the preset model to obtain normalized structural parameters;
determine, from the trained preset model, a network structure comprised in the trained preset model with the normalized structural parameters with values greater than a preset parameter threshold;
form a target network model based on the network structure with the normalized structural parameters with values greater than the preset parameter threshold; and
classify data to be classified based on the target network model to obtain a classification result.

7. The device of claim 6, wherein the processor is further configured to:
normalize the current structural parameters of the preset model after the model parameters are updated based on an activation function and obtain current normalized structural parameters; and
determine the auxiliary loss value based on the current normalized structural parameters.

8. The device of claim 6, wherein the processor is further configured to:
determine a weighted sum of the verification loss value and the auxiliary loss value based on the verification loss value, the auxiliary loss value, and a weight coefficient to obtain a total loss value of the preset model; and
stop training the preset model in response to a change of the total loss value within a preset duration being less than a preset change threshold.

9. The device of claim 6, wherein the processor is further configured to input the data to be classified into the target network model and output M class probabilities of the data to be classified in M classes,
wherein class labels corresponding to a first preset number of class probabilities in the M class probabilities are the classification result of the data to be classified; and
wherein the data to be classified have at least one of following types: an image data type, a text data type, or an audio data type.

10. The device of claim 6, wherein the model parameters further comprise network parameters;
the processor is further configured to:
input the labeled training data in the training set into the preset model to be trained to obtain a second prediction label;
obtain a training loss value based on a difference between the second prediction label and a marked label of the labeled training data;
update the network parameters of the preset model based on the training loss value; and
input the labeled verification data in the verification set into the preset model after the network parameters are updated to update the structural parameters.

11. A non-transitory computer-readable storage medium, having stored instructions thereon that, when executed by a processor of a device for data processing, cause the device to implement operations of:
inputting labeled training data in a training set into a preset model to be trained and updating model parameters of the preset model, wherein the model parameters comprise structural parameters;
inputting labeled verification data in a verification set into the preset model after the model parameters are updated to obtain a first prediction label;
obtaining a verification loss value based on a difference between the first prediction label and a marked label of the labeled verification data;
determining an auxiliary loss value based on current structural parameters of the preset model;
determining whether to stop training the preset model based on the verification loss value and the auxiliary loss value to obtain a trained preset model;
normalizing the structural parameters in the trained preset model based on an activation function after stopping training the preset model to obtain normalized structural parameters;
determining, from the trained preset model, a network structure comprised in the trained preset model with the normalized structural parameters with values greater than a preset parameter threshold;
forming a target network model based on the network structure with the normalized structural parameters with values greater than the preset parameter threshold; and
classifying data to be classified based on the target network model to obtain a classification result.

12. The non-transitory computer-readable storage medium of claim 11, wherein the device is further caused by the processor executing the instructions to implement operations of:
normalizing the current structural parameters of the preset model with the model parameters being updated based on an activation function and obtaining current normalized structural parameters;
wherein the determining an auxiliary loss value based on current structural parameters of the preset model comprises:
determining the auxiliary loss value based on the current normalized structural parameters.

13. The non-transitory computer-readable storage medium of claim 11, wherein the determining whether to stop training the preset model based on the verification loss value and the auxiliary loss value to obtain a trained preset model comprises:
- determining a weighted sum of the verification loss value and the auxiliary loss value based on the verification loss value, the auxiliary loss value, and a weight coefficient to obtain a total loss value of the preset model; and
- stopping training the preset model in response to a change of the total loss value within a preset duration being less than a preset change threshold.

14. The non-transitory computer-readable storage medium of claim 11, wherein the classifying data to be classified based on the target network model to obtain a classification result comprises:
- inputting the data to be classified into the target network model, and outputting M class probabilities of the data to be classified in M classes,
- wherein class labels corresponding to a first preset number of class probabilities in the M class probabilities are the classification result of the data to be classified; and wherein the data to be classified have at least one of following types: an image data type, a text data type, or an audio data type.

15. The non-transitory computer-readable storage medium of claim 11, wherein the model parameters further comprise network parameters;
the inputting labeled training data in a training set into a preset model to be trained and updating model parameters of the preset model comprises:
- inputting the labeled training data in the training set into the preset model to be trained to obtain a second prediction label;
- obtaining a training loss value based on a difference between the second prediction label and a marked label of the labeled training data;
- updating the network parameters of the preset model based on the training loss value; and
- inputting the labeled verification data in the verification set into the preset model after the network parameters are updated to update the structural parameters.

* * * * *